United States Patent
Hapsari et al.

(10) Patent No.: US 11,190,931 B2
(45) Date of Patent: Nov. 30, 2021

(54) BASE STATION AND MEASUREMENT CAPABILITY DETERMINATION METHOD

(71) Applicant: NTT DOCOMO, INC., Tokyo (JP)

(72) Inventors: Wuri Andarmawanti Hapsari, Tokyo (JP); Hideaki Takahashi, Tokyo (JP); Kenji Kai, Tokyo (JP); Ryusuke Matsukawa, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/649,882

(22) PCT Filed: Sep. 12, 2018

(86) PCT No.: PCT/JP2018/033807
§ 371 (c)(1),
(2) Date: Mar. 23, 2020

(87) PCT Pub. No.: WO2019/065243
PCT Pub. Date: Apr. 4, 2019

(65) Prior Publication Data
US 2021/0168590 A1    Jun. 3, 2021

(30) Foreign Application Priority Data
Sep. 27, 2017 (JP) .............................. JP2017-187255

(51) Int. Cl.
*H04W 24/10* (2009.01)
*H04W 8/24* (2009.01)
(Continued)

(52) U.S. Cl.
CPC ............. *H04W 8/24* (2013.01); *H04W 24/10* (2013.01); *H04W 76/15* (2018.02); *H04W 92/20* (2013.01)

(58) Field of Classification Search
CPC ....... H04W 8/24; H04W 24/10; H04W 76/15; H04W 92/20
See application file for complete search history.

(56) References Cited

U.S. PATENT DOCUMENTS 10,129,780 B2    11/2018    Uemura et al.
2016/0219603 A1    7/2016    Fujishiro et al.
(Continued)

FOREIGN PATENT DOCUMENTS

EP    3609222 A1    2/2020
JP    2017514362 A    6/2017
(Continued)

OTHER PUBLICATIONS

International Search Report issued in PCT/JP2018/033807 dated Nov. 13, 2018 (3 pages).
(Continued)

*Primary Examiner* — Chuong A Ngo
(74) *Attorney, Agent, or Firm* — Osha Bergman Watanabe & Burton LLP

(57) ABSTRACT

A master node is disclosed including a controller that determines a number regarding a measurement capability of a terminal in a second radio access scheme, wherein the terminal communicates with a secondary node of the second radio access scheme together with the master node of a first radio access scheme; a transmitter that transmits the number regarding the measurement capability of the terminal in the second radio access scheme to the secondary node; and a receiver that receives from the secondary node a response indicating that the secondary node admits the number regarding the measurement capability of the terminal, wherein the controller controls a measurement operation performed by the terminal based on the response. In other
(Continued)

aspects, a measurement operation control method and a secondary node are also disclosed.

5 Claims, 10 Drawing Sheets

(51) Int. Cl.
*H04W 76/15* (2018.01)
*H04W 92/20* (2009.01)

(56) References Cited

U.S. PATENT DOCUMENTS

| | | |
|---|---|---|
| 2016/0219604 A1 | 7/2016 | Fujishiro et al. |
| 2017/0013485 A1 | 1/2017 | Chang et al. |
| 2017/0201306 A1 | 7/2017 | Shimezawa et al. |
| 2019/0246286 A1* | 8/2019 | Henttonen ............. H04W 8/24 |

FOREIGN PATENT DOCUMENTS

| | | |
|---|---|---|
| WO | 2015029712 A1 | 3/2015 |
| WO | 2015115573 A1 | 8/2015 |
| WO | 2015166846 A1 | 11/2015 |

OTHER PUBLICATIONS

Written Opinion of the International Searching Authority issued in PCT/JP2018/033807 dated Nov. 13, 2018 (3 pages).
3GPP TR 38.804 V1.0.0; "3rd Generation Partnership Project; Technical Specification Group Radio Access Network; Study on New Radio Access Technology; Radio Interface Protocol Aspects (Release 14)"; Mar. 2017 (56 pages).
Office Action issued in counterpart Indian Application No. 202037006579 dated May 28, 2021 (5 pages).
Office Action issued in Japanese Application No. 2019-544551; dated May 11, 2021 (5 pages).
3GPP TSG-RAN WG2 #98; R2-1704138 "Summary of email discussion [97bis#10][NR] MN/SN measurement coordination" NTT DoCoMo, Inc. (Email discussion rapporteur); Hangzhou, China; May 15-19, 2017 (15 pages).
3GPP TS 37.340 V0.3.0 "3rd Generation Partnership Project; Technical Specification Group Radio Access Network; Evolved Universal Terrestrial Radio Access (E-UTRA) and NR; Multi connectivity; Stage 2 (Release 15)" Aug. 2017 (43 pages).
Extended European Search Report issued in European Application No. 18861739.3, dated May 27, 2021 (13 pages).

* cited by examiner

FIG.3

| | UPPER LIMIT OF FREQUENCY LAYERS | UPPER LIMIT OF EVENTS |
|---|---|---|
| EACH RAT (LTE, NR) | – LTE: X1<br>– NR: X2 | – LTE: N1<br>– NR: N2 |
| LTE + NR | Y<br>(LESS THAN X1 + X2) | Z<br>(LESS THAN N1 + N2) |

FIG.4

| UE CATEGORY | | UPPER LIMIT OF FREQUENCY LAYERS | UPPER LIMIT OF EVENTS |
|---|---|---|---|
| UE CATEGORY #A | EACH RAT (LTE, NR) | – LTE: Fn1<br>– NR: Fn2 | – LTE: Me1<br>– NR: Me2 |
| | LTE + NR | YA<br>(LESS THAN Fn1 + Fn2) | ZA<br>(LESS THAN Me1 + Me2) |
| UE CATEGORY #B | EACH RAT (LTE, NR) | – LTE: Fn3<br>– NR: Fn4 | – LTE: Me3<br>– NR: Me4 |
| | LTE + NR | YB<br>(LESS THAN Fn3 + Fn4) | ZB<br>(LESS THAN Me3 + Me4) |

BASE STATION AND MEASUREMENT CAPABILITY DETERMINATION METHOD

TECHNICAL FIELD

The present invention relates to a base station and a measurement capability determination method.

BACKGROUND ART

Currently, in the Third Generation Partnership Project (3GPP), as a successor to Long Term Evolution (LTE) and LTE-advanced, specifications of a new radio communication system called a new radio access technology (NR) are under review. NR is also referred to as 5G.

In NR, it is expected that dual connectivity (DC) will be introduced as with LTE. Dual connectivity is an operation mode of a user equipment that enables connection to base stations of both a master node and a secondary node. As one aspect of dual connectivity in NR, LTE-NR dual connectivity (LTE-NR DC) is proposed in which data are divided between an LTE base station (eNB) and an NR base station (gNB), and the data are simultaneously transmitted or received by the base stations.

As illustrated in FIG. 1, in LTE-NR DC, it is proposed that each of the eNB and the gNB has a radio resource control (RRC) entity. The left diagram of FIG. 1 illustrates LTE-NR DC in which an eNB is a master node and a gNB is a secondary node. The right diagram of FIG. 1 illustrates LTE-NR DC in which a gNB is a master node and an eNB is a secondary node. An RRC state of a user equipment is managed by the master node, but an RRC message can be transmitted and received directly between the user equipment and the secondary node (see Non-Patent Document 1). For example, a configuration of a frequency layer (also referred to as a measurement object) to be measured by the user equipment, a configuration of an event (also referred to as a reporting configuration) at which the user equipment reports a measurement result (radio quality or the like), or the like can be transmitted directly from the secondary node to the user equipment, and the report of the measurement result (also referred to as a measurement report) from the user equipment to the secondary node can be also transmitted directly from the user equipment to the secondary node.

CITATION LIST

Non-Patent Document

Non-Patent Document 1: 3GPP TR38.804 V1.0.0 (2017 March)

SUMMARY OF THE INVENTION

Problem to be Solved by the Invention

In LTE-NR DC, a configuration of a measurement operation (measurement configuration) of the user equipment is performed independently in each of LTE and NR. Since the measurement configuration includes a measurement object and a reporting configuration, the measurement object and the reporting configuration are configured independently in each of LTE and NR. In other words, a measurement capability of the user equipment such as the number of frequency layers to be measured by the user equipment and the number of events at which the user equipment reports a measurement result is determined independently in each of LTE and NR. The eNB and the gNB configure the measurement object and the reporting configuration for the user equipment within a range of independently-determined measurement capability.

On the other hand, it is assumed that each of the measurement capability of the user equipment in LTE and the measurement capability of the user equipment in NR has an upper limit, and a sum of the measurement capabilities of the user equipment in both LTE and NR is also specified to have an upper limit. For example, it is assumed that (1) a condition that it is possible to measure up to 8 frequency layers in LTE, (2) a condition that it is possible to measure up to 8 frequency layers in NR, and (3) a condition that it is possible to measure up to 12 frequency layers in both LTE and NR are specified. In this example, if each of the eNB and the gNB determines the measurement capability of the user equipment independently, the condition of (3) cannot be guaranteed.

The above-described problem occurs not only in LTE-NR DC but also in multi-RAT dual connectivity (MR DC) using different radio access schemes (radio access technologies (RATs)).

It is an object of the invention to appropriately determine a measurement capability of a user equipment in each radio access scheme in dual connectivity using different radio access schemes.

Means for Solving Problem

An aspect of the invention provides a base station of a first radio access scheme that provides dual connectivity to a user equipment together with a secondary node of a second radio access scheme, including:

a measurement capability adjusting unit that provides to the secondary node a candidate for a measurement capability of the user equipment in the first radio access scheme or a candidate for a measurement capability of the user equipment in the second radio access scheme and determines the measurement capability of the user equipment in the first radio access scheme on the basis of a response from the secondary node; and a measurement control unit that controls a measurement operation of the user equipment in the first radio access scheme on the basis of the determined measurement capability.

Effect of the Invention

According to the invention, it is possible to appropriately determine a measurement capability of a user equipment in each radio access scheme in dual connectivity using different radio access schemes and independently perform a configuration of a measurement operation of the user equipment for each radio access scheme.

BRIEF DESCRIPTION OF DRAWINGS

FIG. 3 is an example of defining the same measurement capability for all user equipments;

FIG. 4 is an example of defining different measurement capabilities depending on a UE category;

MODE(S) FOR CARRYING OUT THE INVENTION

Hereinafter, an embodiment of the invention will be described with reference to the accompanying drawings.

In the following embodiment, a base station that provides distributed communication between base stations such as LTE-NR DC, that is, dual connectivity to a user equipment is disclosed.

Overview of Radio System

Figure 1:
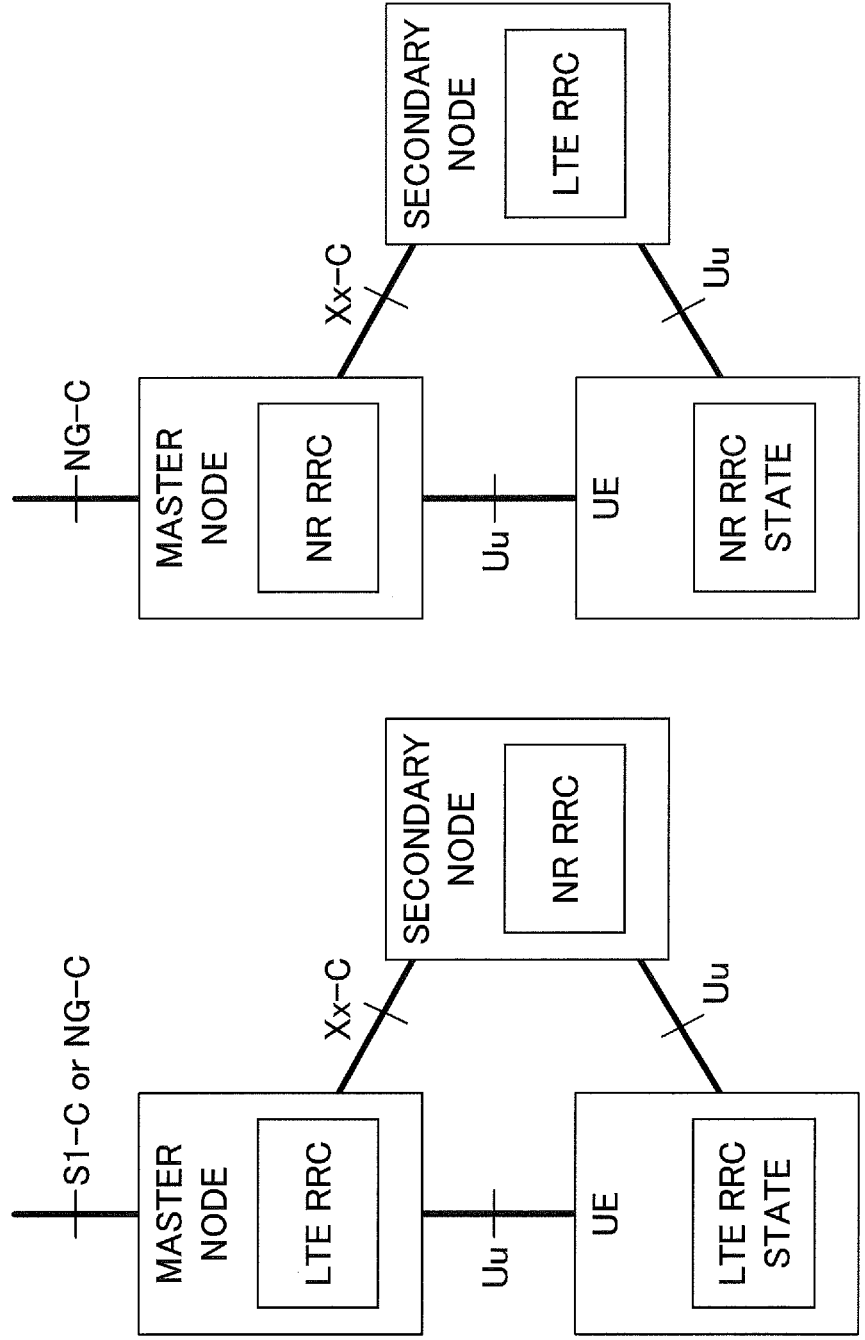
FIG. 1 is a schematic diagram illustrating architecture of LTE-NR DC.
Figure 2:
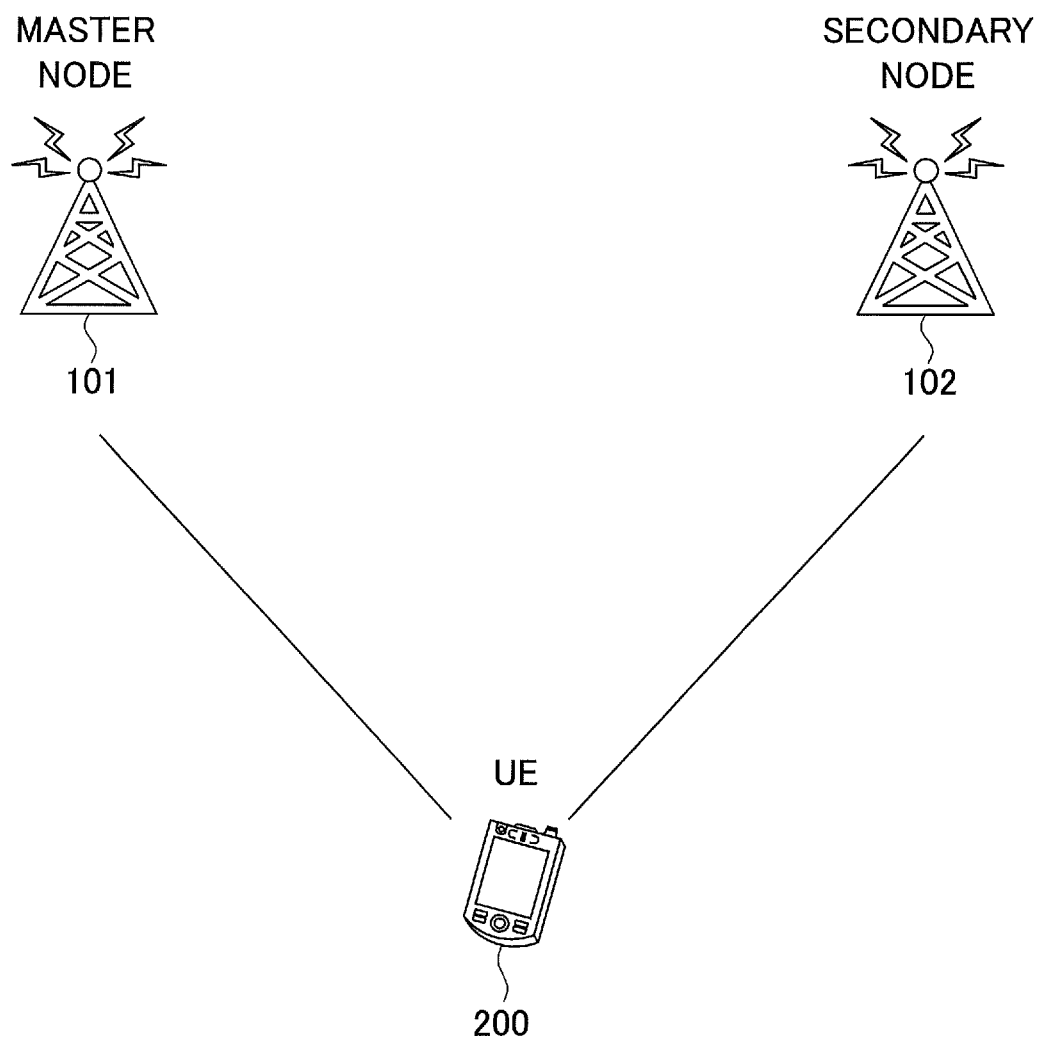
FIG. 2 is a schematic diagram illustrating a radio communication system according to an embodiment of the invention.
Figure 5:
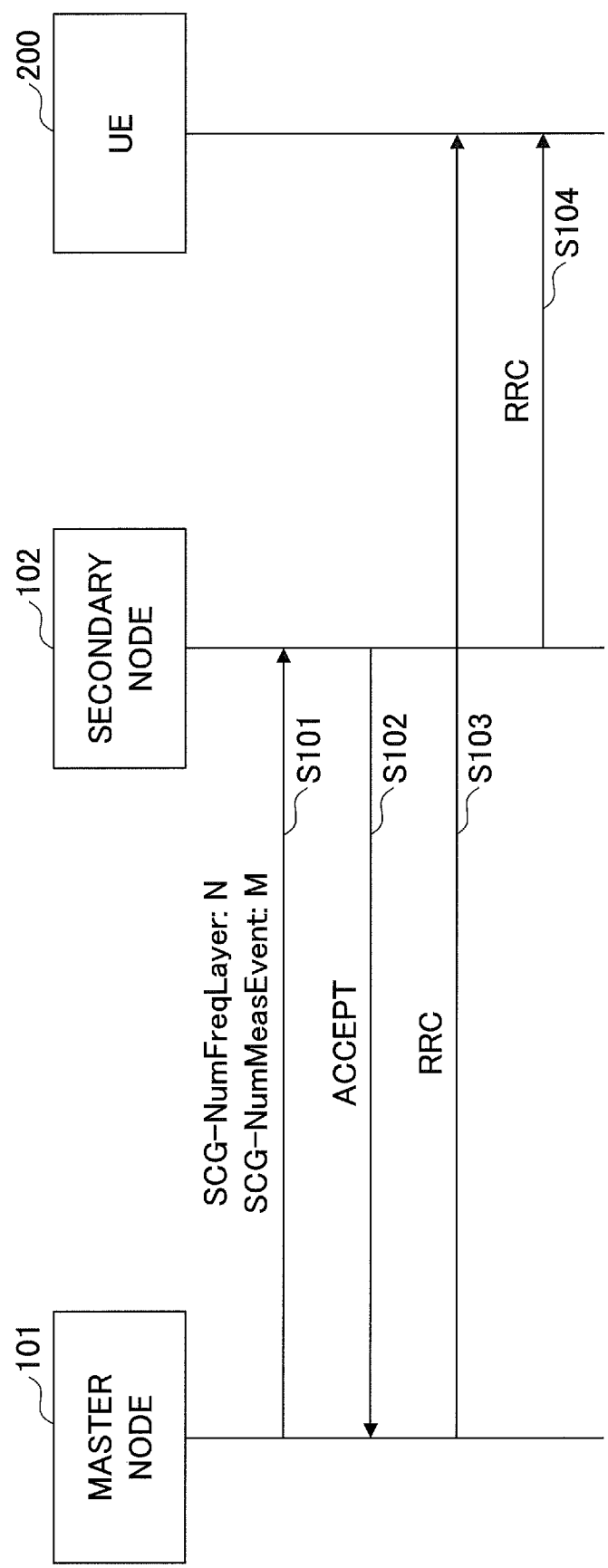
FIG. 5 is a sequence diagram illustrating a measurement capability adjustment procedure between base stations (a first specific example)
Figure 6:
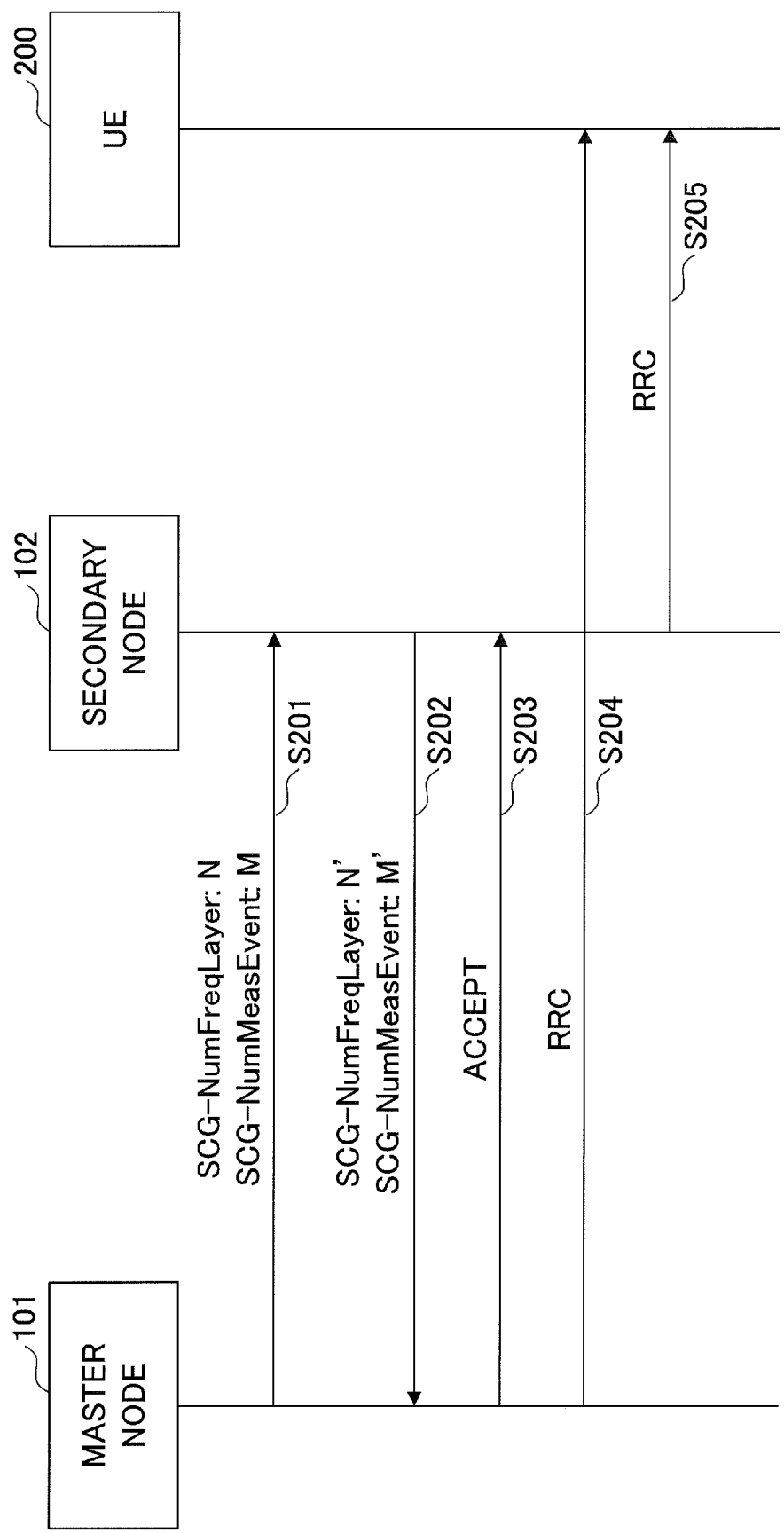
FIG. 6 is a sequence diagram illustrating a measurement capability adjustment procedure between base stations (a second specific example)

First, a radio communication system according to an embodiment of the invention will be described with reference to FIG. 2. FIG. 2 is a schematic diagram illustrating a radio communication system according to an embodiment of the invention. The radio communication system 10 includes a plurality of base stations 101 and 102 and a user equipment 200. The base stations 101 and 102 may be referred to as eNBs in LTE or may be referred to as gNBs in NR. The user equipment 200 may be referred to as a UE.

As illustrated in FIG. 2, the user equipment 200 connects to the base stations 101 and 102 (hereinafter may be collectively referred to as base stations 100) of LTE and/or NR for communication and supports dual connectivity to the base stations 101 and 102. In other words, the user equipment 200 can simultaneously transmit/receive data to/from the base stations 101 and 102 by using a plurality of component carriers provided by the base stations 101 and 102 at the same time. For example, in LTE-NR DC, downlink data addressed to the user equipment 200 from a core network (not illustrated) are distributed between the base stations 101 and 102 via an X2 interface or an Xn interface, and then transmitted from the base stations 101 and 102 to the user equipment 200. In the following embodiment, LTE-NR DC will be described as an example, but an embodiment of the invention is not limited to LTE-NR DC and can also be applied to multi-RAT dual connectivity (MR DC) using different RATS.

In the illustrated embodiment, the radio communication system 10 includes only two base stations 101 and 102, but in this specification, the term "dual connectivity" covers distributed communication using three or more base stations 100 or multi-connectivity as well. Further, a plurality of base stations 100 are typically arranged to cover service areas of the radio communication system 10.

In dual connectivity, one of the base stations 101 and 102 is a master node that manages an RRC state of the user equipment 200, and the other base station is a secondary node which configures a component carrier in the user equipment 200 in accordance with an instruction from the master node. For convenience, the description will be provided under the assumption that the base station 101 is the master node, and the base station 102 is the secondary node. In LTE-NR DC, an LTE base station (eNB) may become the master node, and an NR base station (gNB) may become a master node. A group of serving cells associated with the master node is referred to as a master cell group (MCG), and a group of serving cells associated with the secondary node is referred to as a secondary cell group (SCG).

In a similar manner to cell selection in a typical radio communication system, in dual connectivity, the user equipment 200 measures radio quality to determine whether there is a neighboring cell with a better reception environment than a reception environment of its own cell. The user equipment 200 configures an operation for measuring radio quality via RRC signaling from each of the master node 101 and the secondary node 102 and reports a measurement result. Specifically, each of the master node 101 and the secondary node 102 configures a measurement object for specifying a frequency layer to be measured by the user equipment 200, and configures a reporting configuration for specifying an event for reporting a measurement result. The measurement object and the reporting configuration are linked by an identifier (a measurement ID). The user equipment 200 measures radio quality of the frequency layer specified by the measurement object, and transmits a measurement result (a measurement report) when the event specified by the reporting configuration (for example, a condition exceeding a certain threshold value) is satisfied.

In LTE-NR DC, the measurement object is independently configured in each of LTE and NR, and the reporting configuration is also independently configured in each of LTE and NR. In other words, each of the master node 101 and the secondary node 102 can specify a frequency layer to be measured by the user equipment 200 by means of the measurement object, and can also specify an event at which the user equipment 200 reports a measurement result by means of the reporting configuration. On the other hand, it is undesirable for the master node 101 and the secondary node 102 to unlimitedly specify frequency layers and events for the user equipment 200; thus, an upper limit of frequency layers and an upper limit of events are defined. In the following embodiment, an example in which the upper limit of frequency layers and the upper limit of events are defined will be described, but another upper limit for limiting the measurement capability of the user equipment 200 may be defined.

FIG. 3 is a diagram illustrating an example of defining the same measurement capability for all user equipments. For example, the upper limit of frequency layers which can be configured for the user equipment 200 is defined in each RAT and a sum of frequency layers in all RATS is also defined to have an upper limit. For example, the upper limit of frequency layers in LTE is X1, the upper limit of frequency layers in NR is X2, the upper limit of the sum of frequency layers in both LTE and NR is Y, and Y is less than X1+X2. Similarly, for example, the upper limit of events which can be configured for the user equipment 200 is defined in each RAT and a sum of events in all RATS is also defined to have an upper limit. For example, the upper limit of events in LTE is N1, the upper limit of events in NR is N2, the upper limit of the sum of events in both LTE and NR is Z, and Z is less than N1+N2. It is necessary for the master node 101 and the secondary node 102 to determine the measurement capability of the user equipment 200 in consideration of these upper limits and control the measurement operation of the user equipment 200.

FIG. 4 is a diagram illustrating an example of defining different measurement capabilities depending on a UE category. For example, a UE category #A and a UE category #B may be defined depending on the capability of the user equipment 200. The number of UE categories can be arbitrarily configured. The upper limit of frequency layers and the upper limit of events may differ depending on the UE category. For example, for the UE equipment with the UE category #A, the upper limit of frequency layers in LTE is Fn1, the upper limit of frequency layers in NR is Fn2, the upper limit of the sum of frequency layers in both LTE and NR is YA, and YA is less than Fn1+Fn2. For the user equipment with the UE category #B, the upper limit of frequency layers in LTE is Fn3, the upper limit of frequency layers in NR is Fn4, the upper limit of the sum of frequency layers in both LTE and NR is YB, and YB is less than Fn3+Fn4. Similarly, for example, for the user equipment with the category #A, the upper limit of events in LTE is Me1, the upper limit of events in NR is Me2, the upper limit of the sum of events in both LTE and NR is ZA, and ZA is less than Me1+Me2. For the user equipment with the category #B, the upper limit of events in LTE is Me3, the upper limit of events in NR is Me4, the upper limit of the sum of events in both LTE and NR is ZB, and ZB is less than Me3+Me4.

In the embodiment of the invention, a procedure in which the master node 101 and the secondary node 102 determine the measurement capability of the user equipment 200 in cooperation with each other in consideration of the upper limits as illustrated in FIGS. 3 and 4 will be described.

First Specific Example

In a first specific example, an example in which the master node 101 provides a candidate for the measurement capability of the user equipment 200 to the secondary node 102, and the secondary node 102 accepts the provided candidate for the measurement capability will be described.

In the first specific example, it is assumed that the master node 101 is an LTE base station, and the secondary node 102 is an NR base station. The master node 101 determines the number of frequency layers (MCG-NumFreqLayer:n) and the number of events (MCG-NumMeasEvent:m), each of which is a candidate for the measurement capability of the user equipment 200 in LTE, as well as the number of frequency layers (SCG-NumFreqLayer:N) and the number of events (SCG-NumMeasEvent:M), each of which is a candidate for the measurement capability of the user equipment 200 in NR, with reference to the upper limit in each RAT and the upper limit of the sum in all RATS as illustrated in FIG. 3 or FIG. 4. For example, when a UE category is not considered as illustrated in FIG. 3, n is X1 or less, N is X2 or less, m is N1 or less, and M is N2 or less. Further, n+N is Y or less, and m+M is Z or less. When a UE category is considered as illustrated in FIG. 4, for the user equipment 200 with the UE category #A, n is Fn1 or less, N is Fn2 or less, m is Me1 or less, and M is Me2 or less. Further, n+N is YA or less, and m+M is ZA or less.

The master node 101 provides to the secondary node 102 the number of frequency layers (SCG-NumFreqLayer:N) and the number of events (SCG-NumMeasEvent:M), each of which is the candidate for the measurement capability of the user equipment 200 in NR (S101). The number of frequency layers N and the number of events M may be included in a message transmitted when the master node 101 requests the secondary node 102 to add an SCG or modify the SCG.

The secondary node 102 determines whether the secondary node 102 can accept the number of frequency layers N and the number of events M, each of which is the provided candidate for the measurement capability, and when the secondary node 102 can accept the number of frequency layers N and the number of events M, the secondary node 102 transmits a response (accept and/or positive acknowledgement (ACK or the like); hereinafter the same applies) to the master node 101 indicating that the secondary node 102 accepts them (S102). When the secondary node 102 cannot accept the number of frequency layers N and the number of events M, the secondary node 102 transmits a response (reject and/or negative acknowledgement (NACK or the like); hereinafter the same applies) to the master node 101 indicating that the secondary node 102 does not accept them.

When the master node 101 receives a response (accept) indicating that the secondary node 102 accepts the number of frequency layers N and the number of events M, the master node 101 determines that the master node 101 can use the number of frequency layers (MCG-NumFreqLayer: n) and the number of events (MCG-NumMeasEvent:m), each of which is the candidate for the measurement capability of the user equipment 200 in LTE. When the master node 101 receives a response (reject) from the secondary node 102 indicating that the secondary node 102 does not accept the number of frequency layers N and the number of events M, the procedure may return to step S101 and the master node 101 may provide the number of frequency layers (for example, a value obtained by adding a certain value to N) and the number of events (for example, a value obtained by adding a certain value to M), each of which is another candidate for the measurement capability.

The master node 101 configures a measurement object and a reporting configuration in LTE via RRC signaling in order to control a measurement operation of the user equipment 200 on the basis of the determined number of frequency layers n and the determined number of events m in LTE (S103).

The secondary node 102 configures a measurement object and a reporting configuration in NR via RRC signaling in order to control a measurement operation of the user equipment 200 on the basis of the determined number of frequency layers N and the determined number of events M in NR (S104).

In step S101, the master node 101 provides to the secondary node 102 the number of frequency layers (SCG-NumFreqLayer:N) and the number of events (SCG-NumMeasEvent:M), each of which is the candidate for the measurement capability of the user equipment 200 in NR, but the master node 101 may provide to the secondary node 102 the number of frequency layers (MCG-NumFreqLayer: n) and the number of events (MCG-NumMeasEvent:m), each of which is the candidate for the measurement capability of the user equipment 200 in LTE. For example, the master node 101 determines the number of frequency layers n and the number of events m in LTE without determining the number of frequency layers N and the number of events M in NR, and provides to the secondary node 102 the number of frequency layers n and the number of events m. In step S102, the secondary node 102 determines whether the secondary node 102 can accept the provided number of frequency layers n and the provided number of events m. Specifically, the secondary node 102 determines whether the secondary node 102 can determine the number of frequency layers (SCG-NumFreqLayer:N) and the number of events (SCG-NumMeasEvent:M), each of which is the candidate for the measurement capability of the user equipment 200 in NR, with reference to the upper limit in each RAT and the upper limit of the sum in all RATs as illustrated in FIG. 3 or FIG. 4. When the secondary node 102 can accept the number of frequency layers n and the number of events m, the secondary node 102 transmits a response (accept) to the master node 101 indicating that the secondary node 102 accepts them. When the secondary node 102 cannot accept the number of frequency layers n and the number of events m, the secondary node 102 transmits a response (reject) to the master node 101 indicating that the secondary node 102 does not accept them. When the master node 101 receives a response (reject) from the secondary node 102 indicating that the secondary node 102 does not accept the number of frequency layers n and the number of events m, the procedure may return to step S101 and the master node may provide the number of frequency layers (for example, a value obtained by subtracting a certain value from n) and the number of events (for example, a value obtained by subtracting a certain value from m), each of which is another candidate for the measurement capability.

Alternatively, the following operation may be performed. The master node 101 determines the number of frequency layers n and the number of events m in LTE without determining the number of frequency layers N and the number of events M in NR, and provides to the secondary node 102 the number of frequency layers n and the number of events m in LTE. In step S102, the secondary node 102 determines whether the secondary node 102 can determine the number of frequency layers (SCG-NumFreqLayer:N) and the number of events (SCG-NumMeasEvent:M), each of which is the candidate for the measurement capability of the user equipment 200 in NR, so as not to exceed the upper limit of the sum in all RATS with reference to the upper limit in each RAT and the upper limit of the sum in all RATS, and transmits a response (accept) indicating that the secondary node can determine them to the master node 101. Since the number can be set independently in each RAT, the number determined in each RAT is applied unless it exceeds the upper limit of the sum in all RATS. According to this operation, it is possible to determine the number without exceeding the sum in all RATS, the operation (for example, signaling) is not excessively complex, and thus this operation is desirable. When the upper limit of the sum in all RATS is exceeded, it is possible to address the case by performing, for example, an operation similar to that in a fourth specific example below.

Second Specific Example

In a second specific example, an example in which the master node 101 provides the candidate for the measurement capability of the user equipment 200 to the secondary node 102, and the secondary node 102 requests the master node 101 to accept a measurement capability different from the provided candidate for the measurement capability will be described.

In the second specific example, it is assumed that the master node 101 is an LTE base station, and the secondary node 102 is an NR base station. As with step S101 in the first specific example, the master node 101 determines the number of frequency layers (MCG-NumFreqLayer:n) and the number of events (MCG-NumMeasEvent:m), each of which is the candidate for the measurement capability of the user equipment 200 in LTE, as well as the number of frequency layers (SCG-NumFreqLayer:N) and the number of events (SCG-NumMeasEvent:M), each of which is the candidate for the measurement capability of the user equipment 200 in NR, with reference to the upper limit in each RAT and the upper limit of the sum in all RATS as illustrated in FIG. 3 or FIG. 4.

The master node 101 provides to the secondary node 102 the number of frequency layers (SCG-NumFreqLayer:N) and the number of events (SCG-NumMeasEvent:M), each of which is the candidate for the measurement capability of the user equipment 200 in NR (S201).

When the secondary node 102 cannot accept the number of frequency layers N and the number of events M, each of which is the provided candidate for the measurement capability, the secondary node 102 requests the master node 101 to accept the number of frequency layers (SCG-NumFreqLayer:N') and the number of events (SCG-NumMeasEvent:M') different from the number of frequency layers N and the number of events M (S202). For example, N' is greater than N, and M' is greater than M.

The master node 101 determines whether the master node 101 can accept the number of frequency layers N' and the number of events M', and when the master node 101 can accept the number of frequency layers N' and the number of events M', the master node 101 transmits a response (accept) to the secondary node 102 indicating that the master node 101 accepts them (S203). For example, when the upper limit of the sum of frequency layers and the upper limit of the sum of events in both LTE and NR are not exceeded after accepting the number of frequency layers N' and the number of events M', the master node 101 can accept the number of frequency layers N' and the number of events M'. Further, when the upper limit of the sum of frequency layers and the upper limit of the sum of events in both LTE and NR are not exceeded by reducing the number of frequency layers n and the number of events m in LTE, the master node 101 can accept the number of frequency layers N' and the number of events M'. When the master node 101 cannot accept the number of frequency layers N' and the number of events M', the master node 101 transmits a response (reject) to the secondary node 102 indicating that the master node 101 does not accept them.

When the master node 101 can accept the number of frequency layers N' and the number of events M', the master node 101 determines the number of frequency layers n' and the number of events m' of the user equipment 200 in LTE within a range obtained by subtracting the number of frequency layers N' and the number of events M' from the upper limit of the sum of frequency layers and the upper limit of the sum of events in both LTE and NR. For example, when the UE category is not considered as illustrated in FIG. 3, the master node 101 determines the number of frequency layers n' in LTE that is less than or equal to X1 and within a range of Y-N', and determines the number of events m' in LTE that is less than or equal to N1 and within a range of Z-M'. For example, when the UE category is considered as illustrated in FIG. 4, for the user equipment 200 with the UE category #A, the master node 101 determines the number of frequency layers n' in LTE that is less than or equal to Fn1 and within a range of YA-N', and determines the number of events m' in LTE that is less than or equal to Me1 and within a range of ZA-M'.

The master node 101 configures a measurement object and a reporting configuration in LTE via RRC signaling in order to control the measurement operation of the user equipment 200 on the basis of the determined number of frequency layers n and the determined number of events m in LTE (S204).

When the secondary node 102 receives a response (accept) indicating that the master node 101 accepts the number of frequency layers N' and the number of events M', the secondary node 102 configures a measurement object and a reporting configuration in NR via RRC signaling in order to control the measurement operation of the user equipment 200 on the basis of the number of frequency layers N' and the number of events M' in NR (S205). When the secondary node 102 receives a response (reject) from the master node 101 indicating that the master node 101 does not accept the number of frequency layers N' and the number of events M', the procedure may return to step S202 and the secondary node 102 may request the master node 101 to accept another number of frequency layers (for example, a value obtained by subtracting a certain value from N') and another number of events (for example, a value obtained by subtracting a certain value from M').

In step S201, the master node 101 provides to the secondary node 102 the number of frequency layers (SCG-NumFreqLayer:N) and the number of events (SCG-NumMeasEvent:M), each of which is the candidate for the measurement capability of the user equipment 200 in NR, but the master node 101 may provide to the secondary node 102 the number of frequency layers (MCG-NumFreqLayer:n) and the number of events (MCG-NumMeasEvent:m), each of which is the candidate for the measurement capability of the user equipment 200 in LTE. For example, the master node 101 determines the number of frequency layers n and the number of events m in LTE without determining the number of frequency layers N and the number of events M in NR, and provides to the secondary node 102 the number of frequency layers n and the number of events m. In step S202, the secondary node 102 determines whether the secondary node 102 can accept the provided number of frequency layers n and the provided number of events m. Specifically, the secondary node 102 determines whether the secondary node 102 can determine the number of frequency layers (SCG-NumFreqLayer:N) and the number of events (SCG-NumMeasEvent:M), each of which is the candidate for the measurement capability of the user equipment 200 in NR, with reference to the upper limit in each RAT and the upper limit of the sum in all RATS as illustrated in FIG. 3 or FIG. 4. When the secondary node cannot accept the number of frequency layers n and the number of events m, the secondary node 102 requests the master node 101 to accept the number of frequency layers (MCG-NumFreqLayer:n') and the number of events (MCG-NumMeasEvent:m') different from the number of frequency layers n and the number of events m. For example, n' is smaller than n, and m' is smaller than m. In step S203, the master node 101 determines whether the master node 101 can accept the number of frequency layers n' and the number of events m', and when the master node 101 can accept the number of frequency layers n' and the number of events m', the master node 101 transmits a response (accept) to the secondary node 102 indicating that the master node 101 accepts them. When the master node 101 cannot accept the number of frequency layers n' and the number of events m', the master node 101 transmits a response (reject) to the secondary node 102 indicating that the master node 101 does not accept them. When the secondary node 102 receives a response (reject) from the master node 101 indicating that the master node 101 does not accept the number of frequency layers n' and the number of events m', the procedure may return to step S202 and the secondary node 102 may request the master node 101 to accept another number of frequency layers (for example, a value obtained by adding a certain value to n') and another number of events (for example, a value obtained by adding a certain value to m').

Third Specific Example

In a third specific example, an example in which the master node 101 and the secondary node 102 request the measurement capability until the master node 101 and the secondary node 102 can accept the measurement capability of the user equipment 200 mutually will be described.

In the third specific example, it is assumed that the master node 101 is an LTE base station, and the secondary node 102 is an NR base station. As with step S201 in the second specific example, the master node 101 determines the number of frequency layers (MCG-NumFreqLayer:n) and the number of events (MCG-NumMeasEvent:m), each of which is the candidate for the measurement capability of the user equipment 200 in LTE, and the number of frequency layers (SCG-NumFreqLayer:N) and the number of events (SCG-NumMeasEvent:M), each of which is the candidate for the measurement capability of the user equipment 200 in NR, with reference to the upper limit in each RAT and the upper limit of the sum in all RATS as illustrated in FIG. 3 or FIG. 4.

The master node 101 provides to the secondary node 102 the number of frequency layers (SCG-NumFreqLayer:N) and the number of events (SCG-NumMeasEvent:M), each of which is the candidate for the measurement capability of the user equipment 200 in NR (S301).

As with step S202 in the second specific example, when the secondary node 102 cannot accept the number of frequency layers N and the number of events M, each of which is the provided candidate for the measurement capability, the secondary node 102 requests the master node 101 to accept the number of frequency layers (SCG-NumFreqLayer:N') and the number of events (SCG-NumMeasEvent:M') different from the number of frequency layers N and the number of events M (S302).

The master node 101 determines whether the master node 101 can accept the number of frequency layers N' and the number of events M', and when the master node 101 cannot accept the number of frequency layers N' and the number of events M', the master node 101 requests the secondary node 102 to accept the number of frequency layers (SCG-NumFreqLayer:N") and the number of events (SCG-NumMeasEvent:M") different from the number of frequency layers N' and the number of events M' (S303). For example, N" is smaller than N', and M" is smaller than M'.

Step S302 and step S303 are repeated until the master node 101 and the secondary node 102 can accept the number of frequency layers and the number of events mutually.

Figure 7:
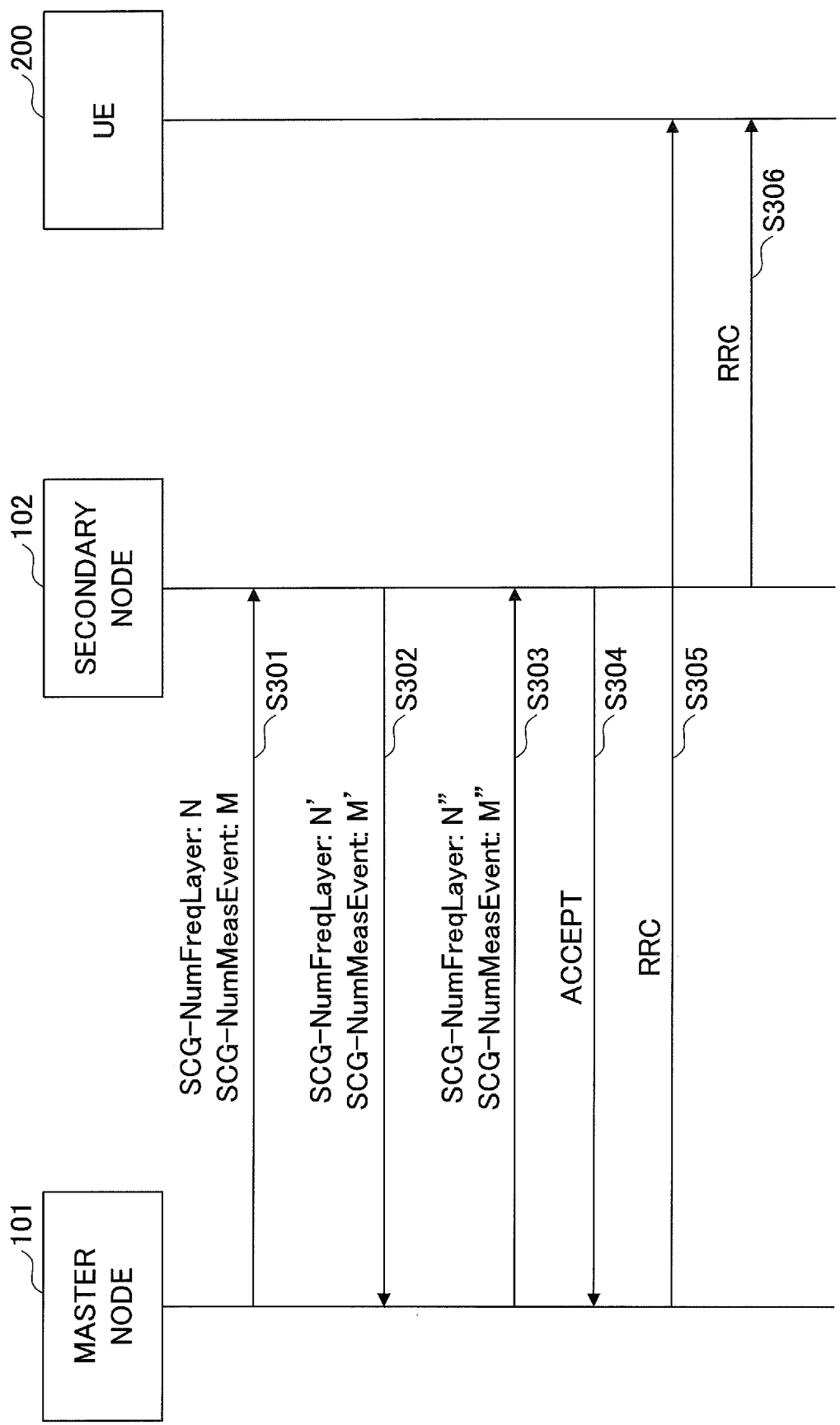
FIG. 7 is a sequence diagram illustrating a measurement capability adjustment procedure between base stations (a third specific example)
Figure 8:
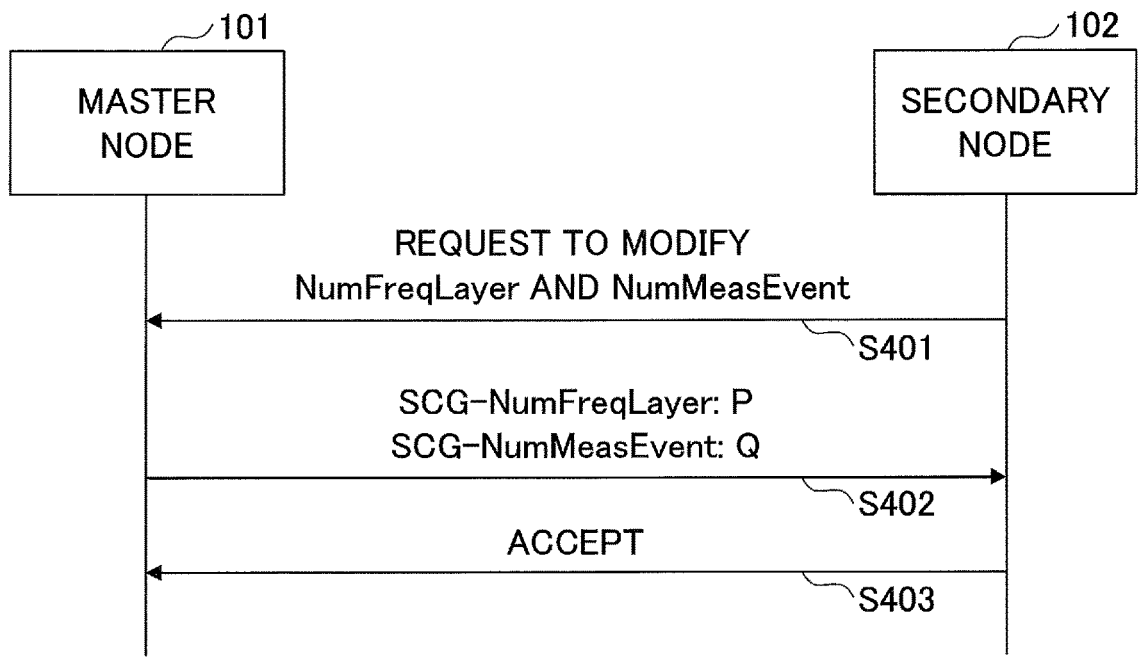
FIG. 8 is a sequence diagram illustrating a measurement capability adjustment procedure between base stations (a fourth specific example)
Figure 9:
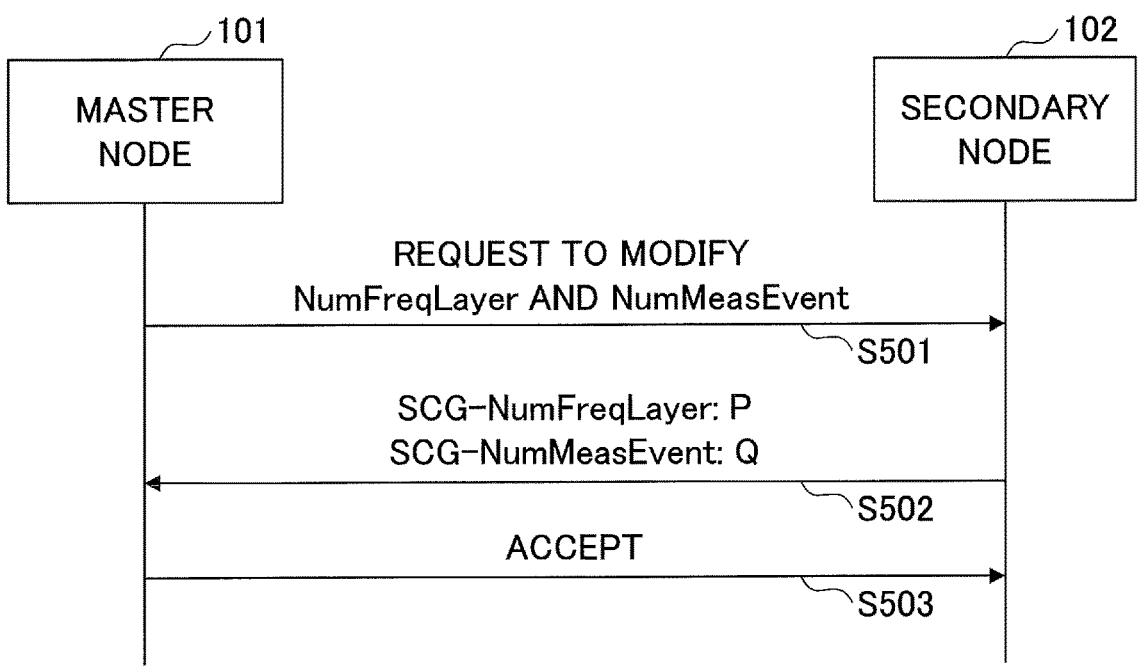
FIG. 9 is a sequence diagram illustrating a measurement capability adjustment procedure between base stations (a fifth specific example)

When the master node 101 and the secondary node 102 can accept the number of frequency layers and the number of events requested from the other party (in the example of FIG. 7, when the secondary node 102 can accept the number of frequency layers N" and the number of events M" requested from the master node 101), a response (accept) indicating that they are accepted is transmitted (S304).

The master node 101 determines the number of frequency layers n" and the number of events m" in LTE on the basis of the number of frequency layers N" and the number of events M". Then, the master node 101 configures a measurement object and a reporting configuration in LTE via RRC signaling in order to control the measurement operation of the user equipment 200 on the basis of the determined number of frequency layers m" and the determined number of events n" in LTE (S305).

In order to control the measurement operation of the user equipment 200, the secondary node 102 configures a measurement object and a reporting configuration in NR via RRC signaling on the basis of the number of frequency layers N" and the number of events M" (S306).

In the third specific example, the master node 101 provides to the secondary node 102 the number of frequency layers (SCG-NumFreqLayer:N) and the number of events (SCG-NumMeasEvent:M), each of which is the candidate for the measurement capability of the user equipment 200 in NR, but the master node 101 may provide to the secondary node 102 the number of frequency layers (MCG-NumFreqLayer:n) and the number of events (MCG-NumMeasEvent:m), each of which is the candidate for the measurement capability of the user equipment 200 in LTE. A procedure similar to the above-described procedure continues until the number of frequency layers and the number of events in LTE requested from the other party can be accepted.

Fourth Specific Example

In a fourth specific example, an example in which the measurement capability of the user equipment 200 determined using any one of the first to third specific examples is modified in accordance to a request from the secondary node 102 will be described. This specific example mainly applies to a case where it is necessary to increase the measurement capability used by the secondary node 102.

In the fourth specific example, it is assumed that the master node 101 is an LTE base station, and the secondary node 102 is an NR base station. For example, when it is necessary to increase the measurement capability of the user equipment 200 in NR due to allocation of a new frequency band, installation of a new neighboring base station, or the like, the secondary node 102 transmits to the master node 101 a request to modify the number of frequency layers and the number of events in NR (S401). The request to modify the number of frequency layers and the number of events in NR may be included in a message transmitted when the secondary node 102 requests the master node 101 to modify the SCG.

The master node 101 provides to the secondary node 102 the number of frequency layers (SCG-NumFreqLayer:P) and the number of events (SCG-NumMeasEvent:Q), each of which is the candidate for the measurement capability of the user equipment 200 in NR, with reference to the upper limit in NR as illustrated in FIG. 3 or FIG. 4 (S402). For example, P is greater than N, and Q is greater than M. However, when the UE category is not considered as illustrated in FIG. 3, P is X2 or less, and Q is N2 or less. When the UE category is considered as illustrated in FIG. 4, for the user equipment 200 of the UE category #A, P is Fn2 or less, and Q is Me2 or less.

The secondary node 102 determines whether the secondary node 102 can accept the provided number of frequency layers N and the provided number of events M, and when the secondary node 102 can accept the number of frequency layers N and the number of events M, the secondary node 102 transmits a response (accept) to the master node indicating that the secondary node 102 accepts them (S403). When the secondary node 102 cannot accept the number of frequency layers P and the number of events Q, the secondary node 102 transmits a response (reject) to the master node 101 indicating that the secondary node 102 does not accept them. In this case, the procedure may return to step S402 and the master node 101 may provide another number of frequency layers (for example, a value obtained by adding a certain value to P) and another number of events (for example, a value obtained by adding a certain value to Q), each of which is another candidate for the measurement capability.

Thereafter, the measurement operation of the user equipment 200 is controlled by the master node 101 and the secondary node (not illustrated), as with steps S103 and S104 of the first specific example.

Fifth Specific Example

In a fifth specific example, an example in which the measurement capability of the user equipment 200 determined by using any one of the first to third specific examples is modified in accordance with a request from the master node 101 will be described. This specific example mainly applies to a case where it is necessary to decrease the measurement capability used by the secondary node 102.

In the fifth specific example, it is assumed that the master node 101 is an LTE base station, and the secondary node 102 is an NR base station. For example, when it is necessary to decrease the measurement capability of the user equipment 200 in NR, the master node 101 transmits to the secondary node 102 a request to modify the number of frequency layers and the number of events in NR (S501). The request to modify the number of frequency layers and the number of events in NR may be included in a message transmitted when the master node 101 requests the secondary node 102 to modify the SCG.

When the secondary node 102 can modify the number of frequency layers and the number of events from M and N to P and Q, respectively, the secondary node 102 provides to the master node 101 the modified number of frequency layers (SCG-NumFreqLayer:P) and the modified number of events (SCG-NumMeasEvent:Q) (S502). For example, P is smaller than N, and Q is smaller than M.

The master node 101 determines whether the master node 101 can accept the number of frequency layers P and the number of events Q, and when the master node 101 can accept the number of frequency layers P and the number of events Q, the master node 101 transmits a response (accept) to the secondary node 102 indicating that the master node accepts them 102 (S503). When the master node 101 cannot accept the number of frequency layers P and the number of events Q, the master node 101 transmits a response (reject) to the secondary node 102 indicating that the master node does not accept them. In this case, the procedure may return to step S502 and the secondary node 102 may provide another number of frequency layers (for example, a value obtained by subtracting a certain value from P) and another number of events (for example, a value obtained by subtracting a certain value from Q), each of which is another candidate for the measurement capability.

Thereafter, the measurement operation of the user equipment 200 is controlled by the master node 101 and the secondary node (not illustrated), as with steps S103 and S104 of the first specific example.

When the measurement capability of the user equipment 200 is modified in accordance with a request from the master node 101, it is also possible to modify the measurement capability of the user equipment 200 in accordance with the procedures of the first to third specific examples.

Configuration of Base Station

Figure 10:
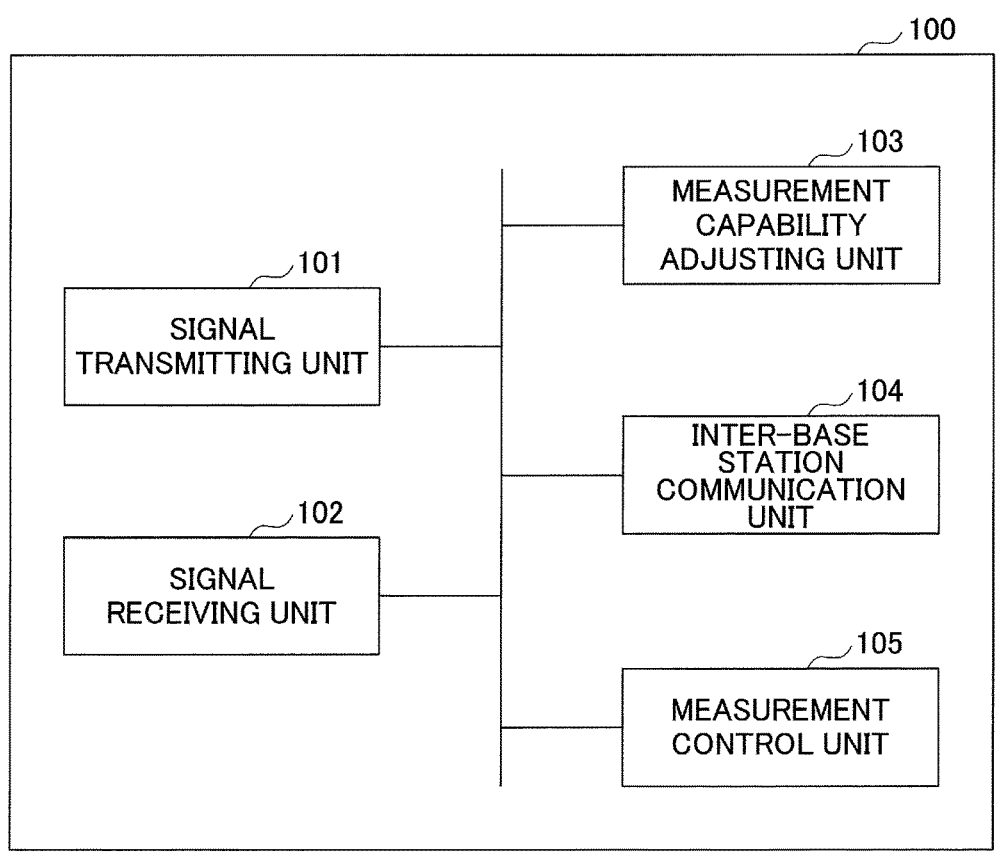
FIG. 10 is a block diagram of a base station.

Next, a functional configuration example of the base station 100 that performs the above-described processing operations will be described with reference to FIG. 10. The base station 100 may have the functions of one of the master node 101 and the secondary node 102 according to one or more of the first to fifth specific examples or may have the functions of both the master node 101 and the secondary node 102 according to one or more of the first to fifth specific examples. As illustrated in FIG. 10, the base station 100 includes a signal transmitting unit 101, a signal receiving unit 102, a measurement capability adjusting unit 103, an inter-base station communication unit 104, and a measurement control unit 105. The functional configuration illustrated in FIG. 10 is only an example. Any functional division and any names of the function units may be used as long as the operations according to an embodiment of the invention can be implemented.

The signal transmitting unit 101 generates a transmission signal to be transmitted to the user equipment 200, and transmits the transmission signal wirelessly. The signal receiving unit 102 wirelessly receives various types of signals from the user equipment 200 and acquires a higher layer signal from the received signals of the physical layer. In order to control the measurement operation of the user equipment 200, the signal transmitting unit 101 transmits an RRC message for configuring a measurement object and a reporting configuration to the user equipment 200. Further, the signal receiving unit 102 receives a measurement result from the user equipment 200.

The measurement capability adjusting unit 103 determines a measurement capability of the user equipment 200 in cooperation with the other node of dual connectivity. The measurement capability adjusting unit 103 exchanges information between the master node 101 and the secondary node 102 via the inter-base station communication unit 104 as described in the first to fifth specific examples, and determines the number of frequency layers and the number of events which are the measurement capabilities of the user equipment 200. For example, when the base station 100 is the master node 101, the measurement capability adjusting unit 103 provides to the secondary node 102 a candidate for the measurement capability to be applied by the master node 101 or a candidate for the measurement capability to be applied by the secondary node 102, further exchanges information with the secondary node 102 if necessary on the basis of a response from the secondary node 102, and determines the measurement capability to be applied by the master node 101. Alternatively, for example, when the base station 100 is the master node 101, the measurement capability adjusting unit 103 receives a request for the measurement capability to be applied by the secondary node 102 or the measurement capability to be applied by the master node 101 from the secondary node 102, determines whether to accept the measurement capability requested from the secondary node 102, further exchanges information with the secondary node 102 if necessary, and determines the measurement capability to be applied by the master node 101. Further, for example, when the base station 100 is the secondary node 102, the measurement capability adjusting unit 103 receives a candidate for the measurement capability to be applied by the master node 101 or a candidate for the measurement capability to be applied by the secondary node 102 from the master node 101, determines whether to accept the measurement capability provided from the master node 101, further exchanges information with the master node 101 if necessary, and determines the measurement capability to be applied by the secondary node 102. Alternatively, for example, when the base station 100 is the secondary node 102, the measurement capability adjusting unit 103 requests the master node 101 to accept the measurement capability to be applied by the secondary node 102 or the measurement capability to be applied by the master node 101, further exchanges information with the master node 101 if necessary on the basis of a response from the master node 101, and determines the measurement capability to be applied by the secondary node 102.

The measurement control unit 105 configures a measurement object and a reporting configuration of the user equipment 200 in order to control the measurement operation of the user equipment 200 on the basis of the measurement capability determined by the measurement capability adjusting unit 103.

Hardware Configuration

The block diagram used to describe the above-mentioned embodiments illustrates blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 11:
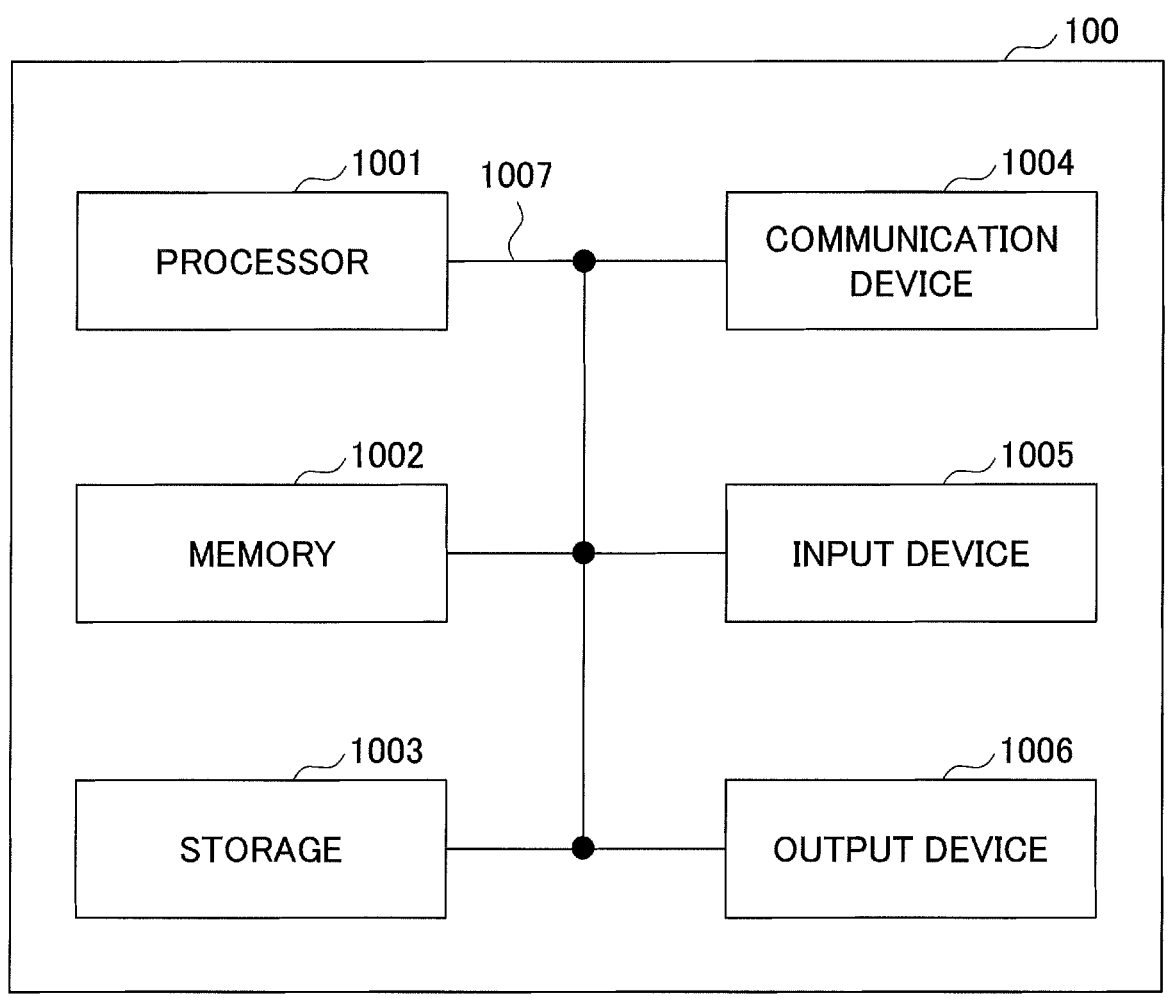
FIG. 11 is a hardware configuration diagram of a base station.

For example, the base station 100 according to the embodiment of the invention may function as a computer that performs the operations of the method according to this embodiment. FIG. 11 is a diagram illustrating an example of a hardware configuration of the base station 100 according to this embodiment. The base station 100 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 may include one or a plurality of devices illustrated in FIG. 11 or may not include some of the devices.

Each function of the base station 100 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, each unit described above may be implemented by the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the operation performed by each unit in the base station 1000 may be implemented by a control program that is stored in the memory 1002 and is executed by the processor 1001. Another functional block may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform the operations according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the signal transmitting unit 101, the signal receiving unit 102, the inter-base station communication unit 104, or the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

The base station 100 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Conclusion of Embodiment

As described above, according to an embodiment of the invention, there is provision for a base station of a first radio access scheme that provides dual connectivity to a user equipment together with a secondary node of a second radio access scheme, including a measurement capability adjusting unit that provides to the secondary node a candidate for a measurement capability of the user equipment in the first radio access scheme or a candidate for the measurement capability of the user equipment in the second radio access scheme and determines the measurement capability of the user equipment in the first radio access scheme on the basis of a response from the secondary node, and a measurement control unit that controls a measurement operation of the user equipment in the first radio access scheme on the basis of the determined measurement capability.

In dual connectivity using different radio access schemes, the base station can appropriately determine a measurement capability of user equipment in each radio access scheme and independently perform a configuration of a measurement operation of the user equipment for each radio access scheme. It is also possible for an operator to configure the measurement capability in the user equipment via an operation, administration, and maintenance (OAM) system in consideration of the upper limits as illustrated in FIGS. 3 and 4. According to this configuration, the master node and the secondary node determine the measurement capability of the user equipment in cooperation with each other, and thus appropriate control over an individual user equipment can be performed.

Further, the measurement capability adjusting unit may determine the candidate for the measurement capability of the user equipment in the first radio access scheme or the candidate for the measurement capability of the user equipment in the second radio access scheme on the basis of an upper limit of a sum of measurement capabilities in both the first radio access scheme and the second radio access scheme, and provides to the secondary node the candidate for the measurement capability of the user equipment in the first radio access scheme or the candidate for the measurement capability of the user equipment in the second radio access scheme, and when a response indicating that the secondary node accepts the provided candidate for the measurement capability is received, the measurement capability adjusting unit may determine the measurement capability of the user equipment in the first radio access scheme within a range obtained by subtracting the provided candidate for the measurement capability from an upper limit of the sum of the measurement capabilities in both the first radio access scheme and the second radio access scheme.

According to this configuration, since the secondary node accepts the measurement capability determined by the master node, it is possible to decrease information exchange necessary for adjusting the measurement capability between the master node and the secondary node.

Further, when a response requesting a measurement capability different from the provided candidate for the measurement capability is received from the secondary node, the measurement capability adjusting unit may determine whether it is possible to accept the requested measurement capability and provide a determination result to the secondary node.

According to this configuration, since the secondary node can request the master node to accept a necessary measurement capability, the measurement capability appropriate for the secondary node can be determined.

Further, when a request to modify the measurement capability of the user equipment in the second radio access scheme is received from the secondary node, the measurement capability adjusting unit may provide to the secondary node a candidate for the measurement capability of the user equipment in the second radio access scheme.

According to this configuration, it is possible to appropriately modify the already-determined measurement capability in accordance with an environmental change or the like in the secondary node.

Supplement

Transmission of information is not limited to the aspects/embodiments described in this specification, and may be performed in other ways. For example, transmission of information may be performed by physical layer signaling (e.g., Downlink Control Information (DCI), Uplink Control Information (UCI)), upper layer signaling (e.g., Radio Resource Control (RRC) signaling, Medium Access Control (MAC) signaling, broadcast information (Master Information Block (MIB) and System Information Block (SIB)), another signal, or a combination thereof. Further, RRC signaling may be referred to as an RRC message, and may be an RRC connection setup message, an RRC connection reconfiguration message, or the like.

Each aspect/embodiment described herein may be applied to Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), and a system that utilize other suitable systems and/or a next generation system expanded on the basis of such a system.

The order of processes, sequences, flowcharts, etc. of each aspect/embodiment described in the present specification may be exchanged as long as there is no inconsistency. For example, for the methods described herein, elements of the various steps are presented in an exemplary order and are not limited to the specific order presented.

The specific operation that is performed by the base station 100 in this specification may be performed by its upper node in some cases. In a network composed of one or more network nodes having a base station, it is clear that the various operations performed for communication with the terminal may be performed by the base station and/or a network node other than the base station. Examples of such a network node include, but not limited to, MME or S-GW. In the above embodiments, a case where there is one network node other than the base station is described; however, a plurality of other network nodes other than the base station may be combined (e.g., MME and S-GW).

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

Determination may be made on the basis of a value (0 or 1) represented by 1 bit, may be made on the basis of a true or false value (boolean: true or false), or may be made on the basis of comparison with a numerical value (for example, comparison with a predetermined value).

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The terms "system" and "network" used in the specification are interchangeably used.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The base station can accommodate one or more (for example, three) cells (also referred to as "sectors"). When the base station accommodates a plurality of cells, the entire coverage area of the base station can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB (or gNB)", "cell", and "sector" can be used interchangeably in this specification. In some cases, the base station is also referred to as a fixed station, a NodeB, an eNodeB (eNB), a gNodeB (gNB), an access point, a femto cell, a small cell, or the like.

In some cases, the user equipment is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "connected" or "coupled" or all modifications of the term means various types of direct or indirect connection or coupling between two or more elements and can include the presence of one or more intermediate elements between two mutually "connected" or "coupled" elements. The connection or the coupling between elements may be physical connection, logical connection, or any combination thereof. When the connection or the coupling is used in the present specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

The term "on the basis of" used in the specification does not mean "only on the basis of" unless otherwise stated. In other words, the term "on the basis of" means both "only on the basis of" and "at least on the basis of".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

In the configuration of each apparatus, "means" may be replaced with "unit", "circuit", "device", or the like.

The terms "include" and "including" and the modifications thereof are intended to be inclusive, similarly to the term "comprising", as long as they are used in the specification or the claims. In addition, the term "or" used in the specification or the claims does not mean exclusive OR.

Although the embodiment of the invention has been described in detail above, the invention is not limited to the specific embodiment described above, and various modifications or changes can be made within the scope of the invention described in claims set forth below.

The present international application is based on and claims priority to Japanese Patent Application No. 2017-187255 filed on Sep. 27, 2017, the entire contents of which are hereby incorporated by reference.

EXPLANATIONS OF LETTERS OR NUMERALS

100 BASE STATION
101 SIGNAL TRANSMITTING UNIT
102 SIGNAL RECEIVING UNIT
103 MEASUREMENT CAPABILITY ADJUSTING UNIT
104 INTER-BASE STATION COMMUNICATION UNIT
105 MEASUREMENT CONTROL UNIT

The invention claimed is:

1. A master node comprising:
a controller that determines a number regarding a measurement capability of a terminal in a second radio access scheme, wherein the terminal communicates with a secondary node of the second radio access scheme together with the master node of a first radio access scheme;
a transmitter that transmits the number regarding the measurement capability of the terminal in the second radio access scheme to the secondary node; and
a receiver that receives from the secondary node a response indicating that the secondary node admits the number regarding the measurement capability of the terminal,
wherein the controller controls a measurement operation performed by the terminal based on the response, and
wherein the number regarding the measurement capability of the terminal is the same as a number of events at which the terminal reports a measurement result.

2. The master node as claimed in claim 1, wherein the controller determines the number regarding the measurement capability of the terminal in the second radio access scheme based on an upper limit of a sum of measurement capabilities of the terminal.

3. A measurement operation control method comprising:
determining, by a master node of a first radio access scheme, a number regarding a measurement capability of a terminal in a second radio access scheme, wherein the terminal communicates with a secondary node of the second radio access scheme together with the master node;
transmitting, by the master node, the number regarding the measurement capability of the terminal in the second radio access scheme to the secondary node;
receiving, by the master node, from the secondary node a response indicating that the secondary node admits the number regarding the measurement capability of the terminal; and
controlling, by the master node, a measurement operation performed by the terminal based on the response,
wherein the number regarding the measurement capability of the terminal is the same as a number of events at which the terminal reports a measurement result.

4. A secondary node comprising:
a receiver that receives from a master node of a first radio access scheme a number regarding a measurement capability of a terminal in a second radio access scheme, wherein the terminal communicates with the secondary node of the second radio access scheme together with the master node;

a transmitter that transmits a response indicating that the secondary node admits the number regarding the measurement capability of the terminal; and a controller that controls a measurement operation performed by the terminal based on the admitted number regarding the measurement capability of the terminal, wherein the number regarding the measurement capability of the terminal is the same as a number of events at which the terminal reports a measurement result.

5. A radio communication system including a terminal, a master node, and a secondary node, wherein the master node comprises:

a controller that determines a number regarding a measurement capability of the terminal in a second radio access scheme, wherein the terminal communicates with the secondary node of the second radio access scheme together with the master node of a first radio access scheme;

a transmitter that transmits the number regarding the measurement capability of the terminal in the second radio access scheme to the secondary node; and a receiver that receives from the secondary node a response indicating that the secondary node admits the number regarding the measurement capability of the terminal, wherein the controller controls a measurement operation performed by the terminal based on the response, wherein the secondary node comprises:

a receiver that receives from the master node of the first radio access scheme the number regarding the measurement capability of the terminal in the second radio access scheme;

a transmitter that transmits a response indicating that the secondary node admits the number regarding the measurement capability of the terminal; and a controller that controls a measurement operation performed by the terminal based on the admitted number regarding the measurement capability of the terminal, wherein the number regarding the measurement capability of the terminal is the same as a number of events at which the terminal reports a measurement result.

* * * * *